United States Patent
Yoon et al.

(10) Patent No.: US 8,450,886 B2
(45) Date of Patent: May 28, 2013

(54) LINEAR VIBRATOR

(75) Inventors: Jong Hyun Yoon, Gyunggi-do (KR); Seung Hyeon Jeong, Seoul (KR); Joon Choi, Gyunggi-do (KR); Jun Kun Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 51 days.

(21) Appl. No.: 13/074,550

(22) Filed: Mar. 29, 2011

(65) Prior Publication Data

US 2011/0278959 A1 Nov. 17, 2011

(30) Foreign Application Priority Data

May 14, 2010 (KR) .................. 10-2010-0045655

(51) Int. Cl.
*H02K 33/06* (2006.01)

(52) U.S. Cl.
USPC ................. 310/14; 310/17; 310/25; 381/396; 340/384.7

(58) Field of Classification Search
USPC ................... 310/81, 13–20, 25, 30; 381/396, 381/398, 409, 410, 412; 340/384.1, 384.7, 340/388.1
See application file for complete search history.

(56) References Cited

U.S. PATENT DOCUMENTS

| | | | | |
|---|---|---|---|---|
| 5,894,263 | A * | 4/1999 | Shimakawa et al. | 340/388.1 |
| 6,753,630 | B1 | 6/2004 | Ueda et al. | |
| 7,038,335 | B2 * | 5/2006 | Choi et al. | 310/12.24 |
| 7,224,090 | B2 * | 5/2007 | Oh et al. | 310/14 |
| 7,288,860 | B2 * | 10/2007 | Cheung et al. | 310/12.12 |
| 7,538,463 | B2 * | 5/2009 | Miura et al. | 310/81 |
| 2001/0013729 | A1 | 8/2001 | Hamaguchi et al. | |
| 2005/0285453 | A1 | 12/2005 | Oh et al. | |
| 2005/0285454 | A1 | 12/2005 | Choi et al. | |
| 2008/0306332 | A1 | 12/2008 | Choi et al. | |

FOREIGN PATENT DOCUMENTS

| | | |
|---|---|---|
| CN | 1227513 A | 9/1999 |
| CN | 1640558 A | 7/2005 |
| JP | 2009-166016 A | 7/2009 |
| KR | 10-2006-0046360 | 5/2006 |
| KR | 10-2008-0107506 | 12/2008 |
| KR | 10-2010-0117896 A | 11/2010 |

OTHER PUBLICATIONS

Korean Office Action, w/ English translation thereof, issued in Korean Patent Application No. KR 10-2010-0045655 dated Jul. 22, 2011.
Office Action issued in Chinese Patent Application No. 201110113038.6 dated Apr. 3, 2013.

* cited by examiner

*Primary Examiner* — Dang Le
(74) *Attorney, Agent, or Firm* — McDermott Will & Emery LLP

(57) ABSTRACT

There is provided a linear vibrator including: a housing having an internal space formed therein; a magnetic field unit including a yoke disposed in the internal space and having a magnet and a magnet insertion part formed therein, and interacting with a coil to which power is applied to linearly move in the internal space, the magnet insertion part determining an insertion position of the magnet; and an elastic member disposed in a space between the housing and the magnetic field unit and elastically supporting linear movement of the magnetic field unit.

10 Claims, 5 Drawing Sheets

LINEAR VIBRATOR

CROSS-REFERENCE TO RELATED APPLICATIONS

This application claims the priority of Korean Patent Application No. 10-2010-0045655 filed on May 14, 2010, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator having increased internal component density and vibration force.

2. Description of the Related Art

A linear vibrator, a component converting electrical energy into mechanical vibrations using the principle of generating electromagnetic force, is mounted in an electronic apparatus such as a mobile communications terminal, a portable game machine, or the like, to be used for silently notifying a user of call reception by transferring vibrations thereto.

In accordance with the recent trend for compactness and slimness in mobile communications terminals, a compact, multi-functional linear vibrator has also been mounted therein.

A stator and a vibrator vibrated due to electromagnetic interaction therebetween are disposed in an internal space of the linear vibrator, according to the related art.

Components forming the vibrator and the stator, that is, an elastic member and a yoke, are surface-contacted with each other, thereby having difficulty in securing concentricity.

In addition, it has been difficult to increase the density of the linear vibrator due to the thickness of individual internal components.

As a result, there has been a limitation in increasing a size of a mass body within the internal space and it has been difficult to increase vibration strength.

Accordingly, there is a demand for research into a linear vibrator having a mass body increased in size.

SUMMARY OF THE INVENTION

An aspect of the present invention provides a linear vibrator having increased internal component density and vibration force.

According to an aspect of the present invention, there is provided a linear vibrator including: a housing having an internal space formed therein; a magnetic field unit including a yoke disposed in the internal space and having a magnet and a magnet insertion part formed therein, and interacting with a coil to which power is applied to linearly move in the internal space, the magnet insertion part determining an insertion position of the magnet; and an elastic member disposed in a space between the housing and the magnetic field unit and elastically supporting linear movement of the magnetic field unit.

The yoke may include a flat part having the magnet insertion part formed therein, a mass body fixing part being bent from the flat part in a mounting direction of the magnet to fix a mass body, and a claw part being bent from the mass body fixing part to support a bottom of the mass body.

One of the flat part and the elastic member may be provided with a protrusion part and the other may be provided with a protrusion part receiving hole, and the protrusion part may be fixedly coupled to the protrusion part receiving hole.

The magnet insertion part may include a dented part dented from the yoke to protrude from the yoke.

The dented part may be formed such that an outer surface thereof may be press-fitted into a dented part insertion part formed in the elastic member.

One of the elastic member and the flat part around the dented part may be provided with a protrusion part and the other may be provided with a protrusion part receiving hole, and the protrusion part may be fixedly coupled to the protrusion part receiving hole.

The housing may include a cylindrical upper case of which a lower portion is open and a bracket closing the lower portion of the upper case and having the coil mounted thereon.

A yoke plate may be provided on a surface opposite to a contact surface between the magnet and the yoke.

The coil may have a cylindrical shape such that a space in which the magnetic field unit moves is formed, and the magnetic fluid preventing a contact between the magnetic field unit and the coil may be provided in a clearance therebetween.

The housing may include a damper formed on a surface thereof, the damper preventing the magnetic field unit from contacting the housing due to vibrations.

According to another aspect of the present invention, there is provided a linear vibrator, including: a cylindrical upper case of which a lower portion is open; a bracket fixed to the open lower portion of the upper case to thereby form an internal space and having a coil fixed thereto, the coil having external power applied thereto; a magnetic field unit including a yoke disposed in the internal space and having a magnet and a magnet insertion part formed therein, and interacting with the coil to linearly move in the internal space when the power is applied to the coil, the magnet insertion part determining an insertion position of the magnet; and an elastic member configured of a ring-shaped housing fixing part fixed to the upper case, a yoke fixing part fixed to the other surface of the yoke, and a plurality of spiral connecting strip parts disposed such that an elastic space is formed between the housing fixing part and the yoke fixing part.

The yoke may include a flat part having the magnet insertion part formed therein, a mass body fixing part being bent from the flat part in a mounting direction of the magnet to fix a mass body, and a claw part being bent from the mass body fixing part to support a bottom of the mass body.

The yoke fixing part may have a flat plate shape, one of the flat part and the yoke fixing part may be provided with a protrusion part and the other may be provided with a protrusion part receiving hole, and the protrusion part may be fixedly coupled to the protrusion part receiving hole.

The yoke fixing part may have a through hole formed therein, the magnet insertion part may include a dented part dented from the yoke to protrude from the yoke, and the dented part may be press-fitted into the through hole to be fixed thereto.

One of an outer surface of the dented part and the yoke fixing part may be provided with a protrusion part and the other may be provided with a protrusion part receiving hole, and the protrusion part may be fixedly coupled to the protrusion part receiving hole.

The yoke fixing part may be fixedly bonded to the flat part, and an area of a bonding surface between the yoke fixing part and the flat part may be smaller than that of the yoke fixing part.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
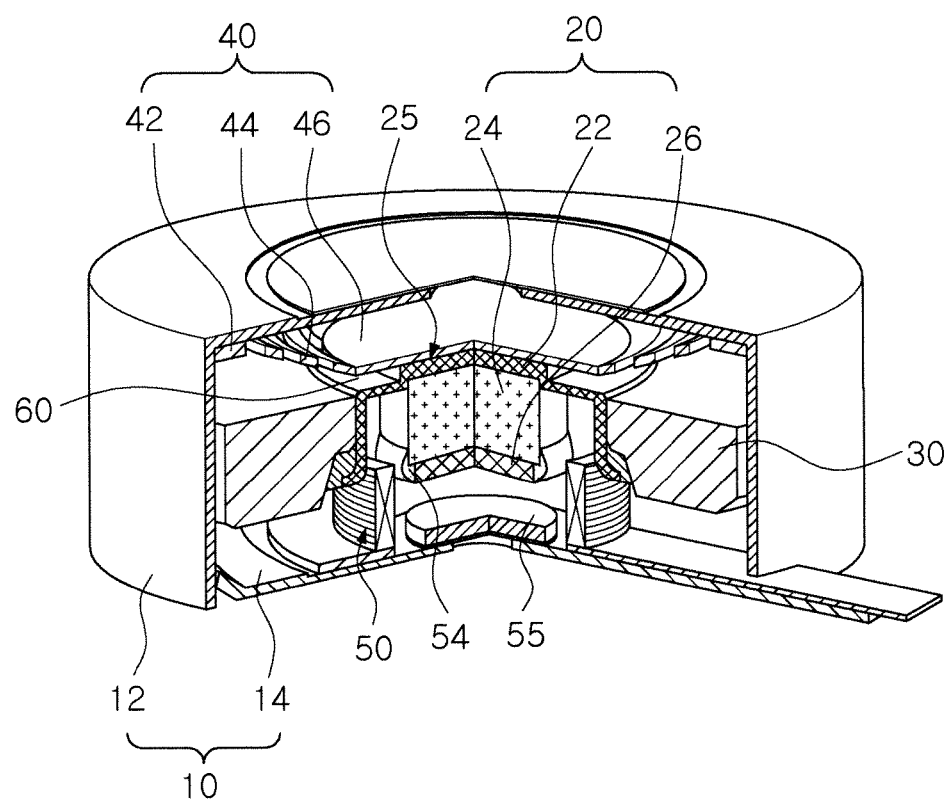
FIG. 1 is a partially cut-away perspective view schematically showing a linear vibrator according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, throughout the drawings, the same or similar reference numerals will be used to designate the same or like components having the same functions in the scope of the similar idea.

Figure 2:
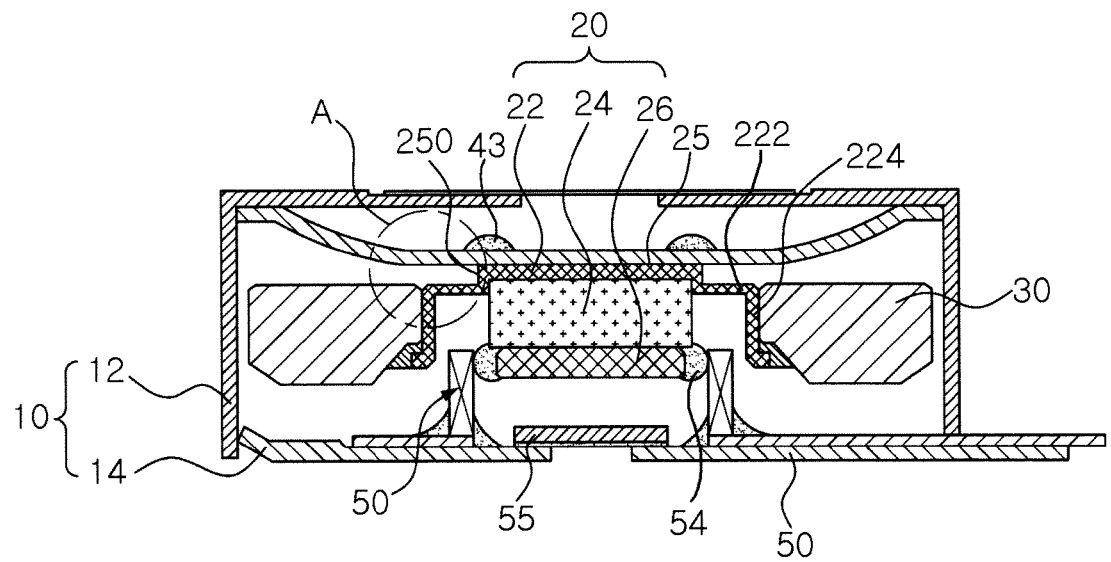
FIG. 2 is a cross-sectional view schematically showing the linear vibrator of FIG. 1.
Figure 3:
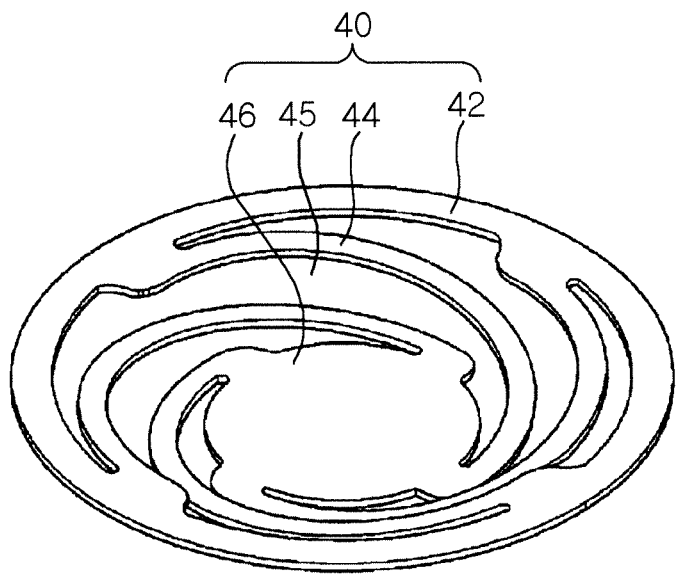
FIG. 3 is a perspective view schematically showing an elastic member according to an exemplary embodiment of the present invention.

FIG. 1 is a partially cut-away perspective view schematically showing a linear vibrator according to an exemplary embodiment of the present invention; FIG. 2 is a cross-sectional view schematically showing the linear vibrator of FIG. 1; and FIG. 3 is a perspective view schematically showing an elastic member according to an exemplary embodiment of the present invention.

Figure 4:
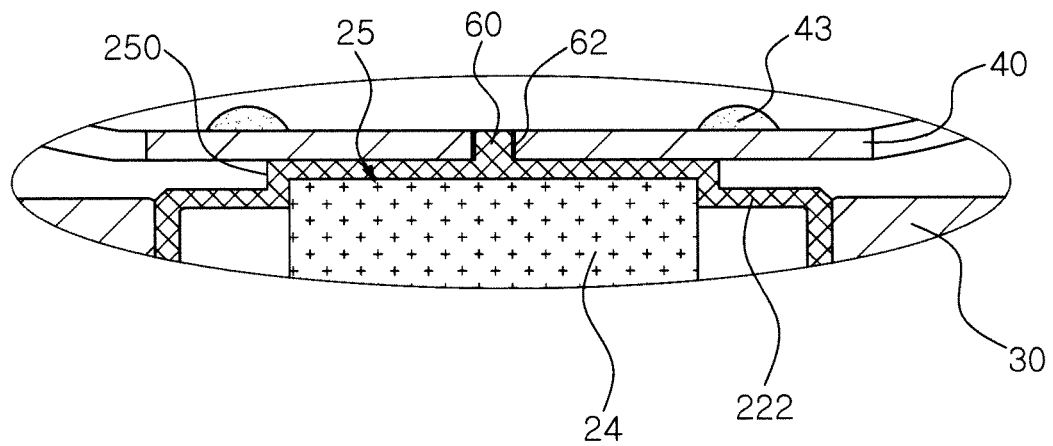
FIG. 4 is an enlarged cross-sectional view showing a first modified example of part A of FIG. 2.
Figure 5:
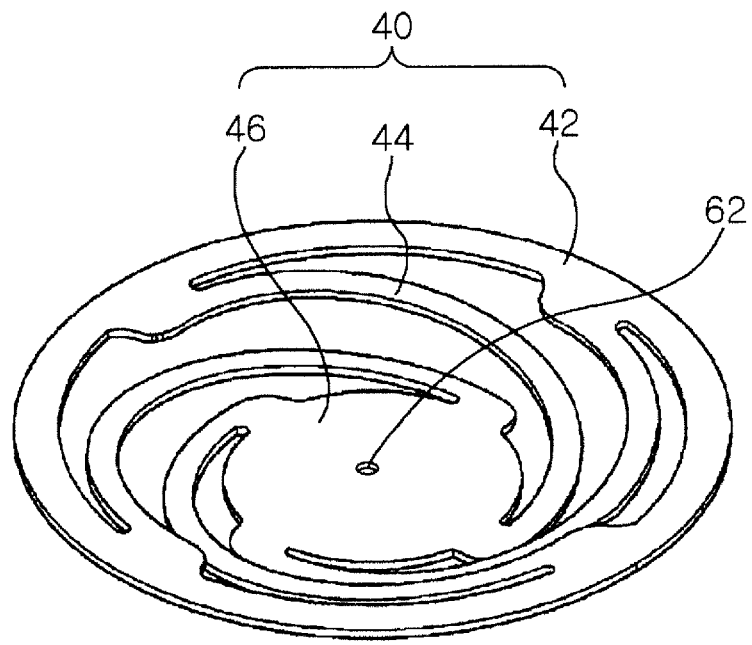
FIG. 5 is a perspective view schematically showing an elastic member applied to FIG. 4.

In addition, FIG. 4 is an enlarged cross-sectional view showing a first modified example of part A of FIG. 2, and FIG. 5 is a perspective view schematically showing an elastic member applied to FIG. 4.

Referring to FIGS. 1 through 5, a linear vibrator 1 according to an exemplary embodiment of the present invention may include a housing 10, a magnetic field unit 20, and an elastic member 40.

The housing 10 may have an internal space formed therein, wherein the internal space has internal components forming the vibrator disposed therein. The housing 10 may be implemented by various methods, and particularly, should be provided such that the internal components may be easily disposed therein.

The housing 10 according to an exemplary embodiment of the present invention may include a cylindrical upper case 12 of which a lower portion is open and a bracket 14 closing the lower portion of the upper case 12 and having a coil mounted thereon.

The magnetic field unit 20 may generate a magnetic field having a predetermined strength, and may include a yoke 22 and a magnet 24 that are disposed in the internal space of the housing 10. In addition, the magnet 24 may include a yoke plate 26 formed on a surface opposite to a contact surface between the magnet 24 and the yoke 22.

The yoke 22 may have a magnet insertion part 25 determining an insertion position of the magnet 24 in order to secure concentricity between the yoke 22 and the magnet 24.

The yoke 22 has a cylindrical shape in which an upper portion thereof is closed and a lower portion thereof is opened, and more specifically, may include a flat part 222 having the magnet insertion part 25 formed therein, a mass body fixing part 224 formed to be bent from the flat part 222 in a mounting direction of the magnet 24 to fix a mass body 30, and a claw part 226 formed to be bent from the mass body fixing part 224 to support a bottom of the mass body 30.

The magnet 24 may be bonded and fixed to one surface of the yoke 22 using an adhesive.

A diameter of an inner circumferential surface of the yoke 22 is larger than that of an outer circumferential surface of the magnet 24, such that an air gap (AG) having a predetermined size may be formed between the inner circumferential surface of the yoke 22 and the outer circumferential surface of the magnet 24.

The coil 50, allowing current to flow in a magnetic field formed by the magnetic field unit 20 and vibrate the magnetic field unit 20, may be disposed within the air gap (AG).

The coil 50 may have a cylindrical shape so that a space in which the magnetic field unit 20 can move is formed, and the magnetic fluid 54 preventing the contact between the magnetic field unit 20 and the coil 50 may be provided in a clearance therebetween.

A damper 55 may be formed in an upper surface of the bracket 14 and prevent the magnetic field unit 20 from contacting the housing 10 due to vibration. The damper 55 may be made of a rubber material, or the like; however, a material of the damper may be variously selected.

The elastic member 40 may include a housing fixing part 42 fixed to any portion of the upper case 12, a yoke fixing part 46 surface-contacting a surface opposite to the contact surface between the magnet 24 and the yoke 22, and a plurality of connecting strip parts 44 disposed such that an elastic space 45 is formed between the housing fixing part 42 and the yoke fixing part 46.

The housing fixing part 42 is a fixed end of the elastic member 40 fixed to the housing 10 that is not vibrated, and the yoke fixing part 46 is a free end of the elastic member 40 vibrated due to the vibration of the magnetic field unit 20.

The elastic member 40 may be a spring member, the yoke fixing part 46 may have a flat plate shape, the housing fixing part 42 may have an annular rim shape of which the center is open, and the connecting strip parts 44 may have a spiral shape connecting the yoke fixing part 46 and the housing fixing part 42.

Herein, the yoke fixing part 46 may be bonded and fixed to the flat part 222. An area of a bonding surface formed by the bonding of the yoke fixing part 46 and the flat part 222 may be smaller than that of the yoke fixing part 46.

When the area of the yoke fixing part 46 is larger than that of the bonding surface, assembly tolerance for the bonding may be secured to improve assembling efficiency.

The yoke 22 may have the magnet insertion part 25 determining the insertion position of the magnet 24 in order to secure concentricity between the yoke 22 and the magnet 24, and may have a protrusion structure introduced in order to secure concentricity between the yoke 22 and the elastic member 40.

One of the flat part 222 of the yoke 22 and the elastic member 44 is provided with a protrusion part 60, and the other is provided with a protrusion part receiving hole 62, wherein the protrusion part 60 may be fixedly coupled to the protrusion part receiving hole 62.

Meanwhile, the magnet insertion part 25 may include a dented part 250 dented from the yoke 22 to protrude from the yoke 22.

The exemplary embodiment of FIGS. 2 and 3 shows a case in which the dented part 250 surface-contacts the yoke fixing part 46 to be fixed thereto, and the exemplary embodiment of FIGS. 4 and 5 show a case in which the protrusion part 60 is formed in the dented part 250, the protrusion part receiving hole 62 is formed in the elastic member 40, and the protrusion part 60 is coupled to the protrusion part receiving hole 62 to match the concentricity between the yoke 20 and the elastic member 40.

Figure 6:
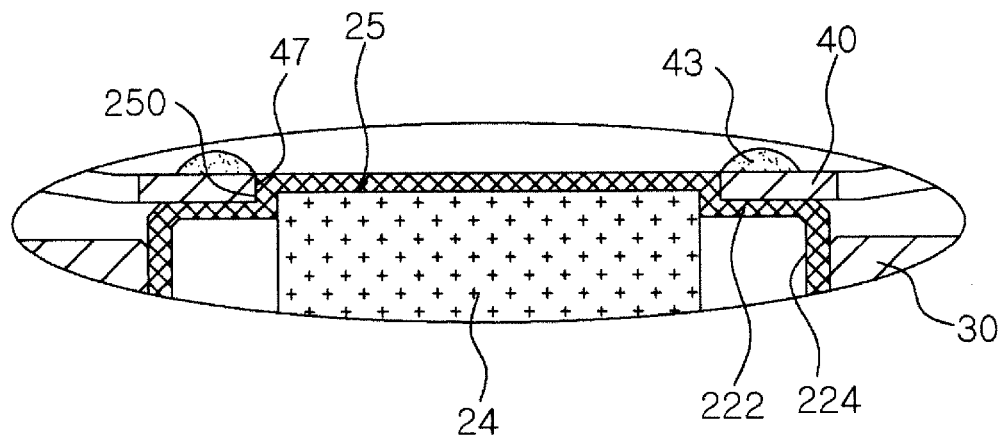
FIG. 6 is an enlarged cross-sectional view showing a second modified example of part A of FIG. 2.
Figure 7:
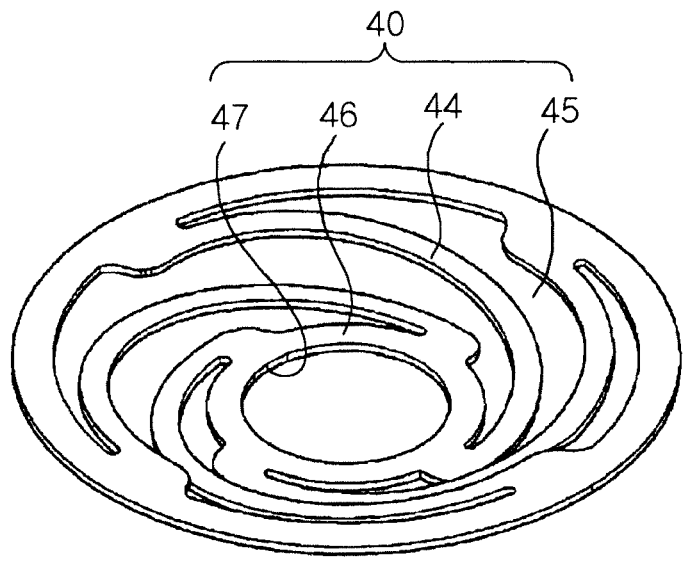
FIG. 7 is a perspective view schematically showing an elastic member applied to FIG. 6.

FIG. 6 is an enlarged cross-sectional view showing a second modified example of part A of FIG. 2, and FIG. 7 is a perspective view schematically showing an elastic member applied to FIG. 6.

Referring to FIGS. 6 and 7, the dented part 250 may be dented from the flat part 222 of the yoke 22 to protrude to an upper portion of the flat part 222.

The magnet insertion part 25 may include the dented part 250 dented from the yoke 22 to protrude from the yoke 22.

The dented part 250 may be formed such that an outer surface thereof is press-fitted into a dented part insertion part 47 formed in the elastic member 40. Accordingly, the concentricity between the elastic member 40 and the yoke 22 may be not only secured, but also the vibratory displacement of the magnetic field part 20 may be further secured, as compared to a case in which the dented part 250 surface-contacts the yoke fixing part 46 to be fixed thereto.

Herein, the magnetic fluid may applied to an upper surface of the elastic member 40 to dampen contact impacts between the elastic member 40 and the upper case 12.

Figure 8:
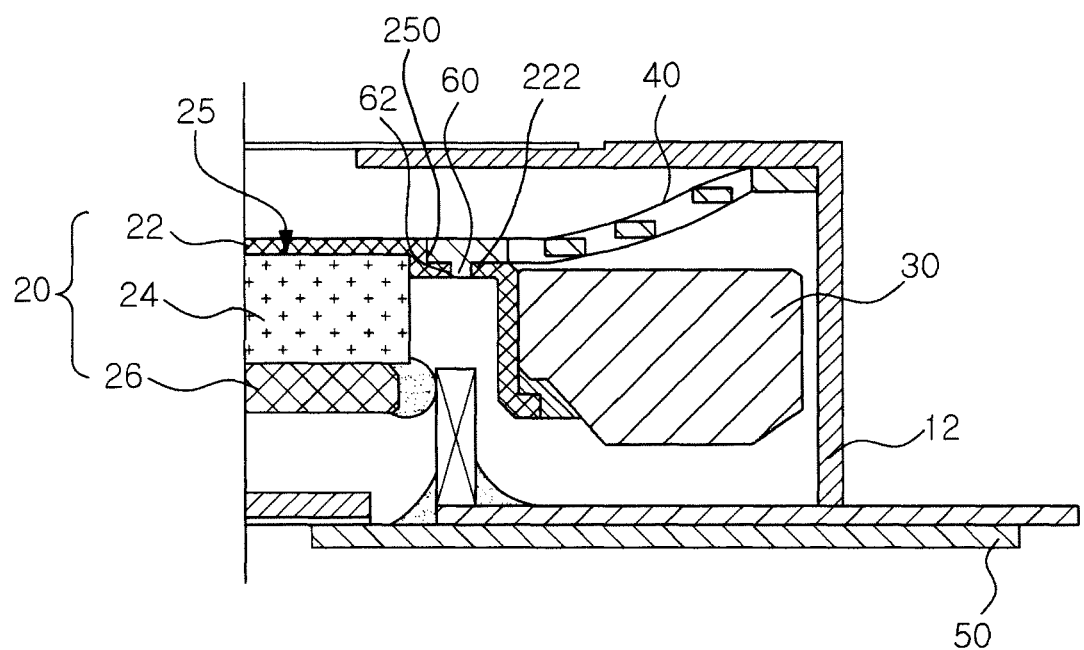
FIG. 8 is a cross-sectional view showing a third modified example of FIG. 2.
Figure 9:
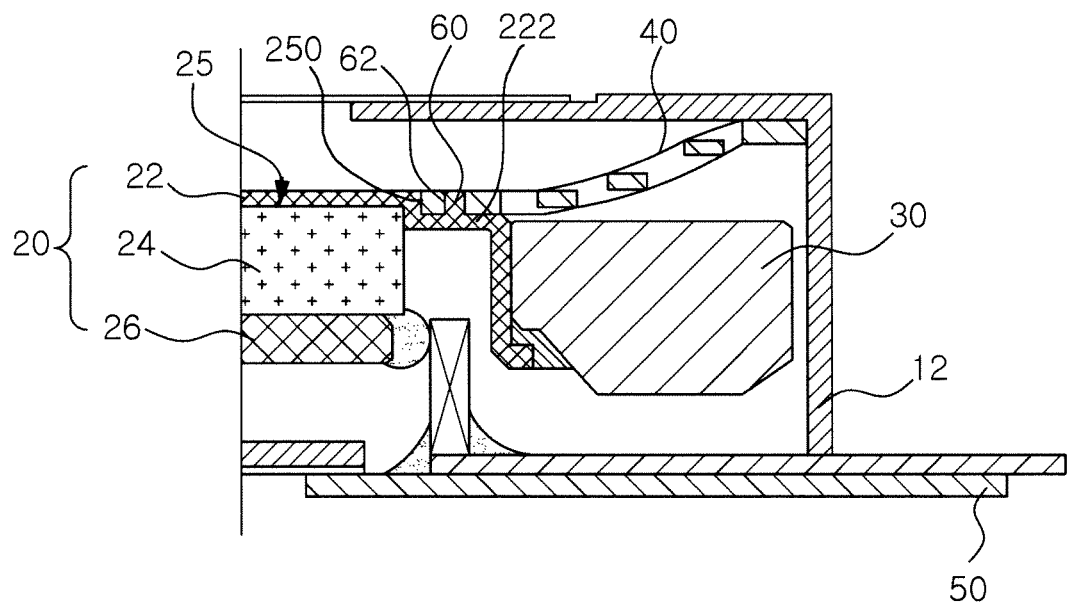
FIG. 9 is a cross-sectional view showing a fourth modified example of FIG. 2.

FIG. 8 is a cross-sectional view showing a third modified example of FIG. 2; FIG. 9 is a cross-sectional view showing a fourth modified example of FIG. 2; and FIG. 10 is a perspective view schematically showing an elastic member applied to FIG. 9.

Figure 10:
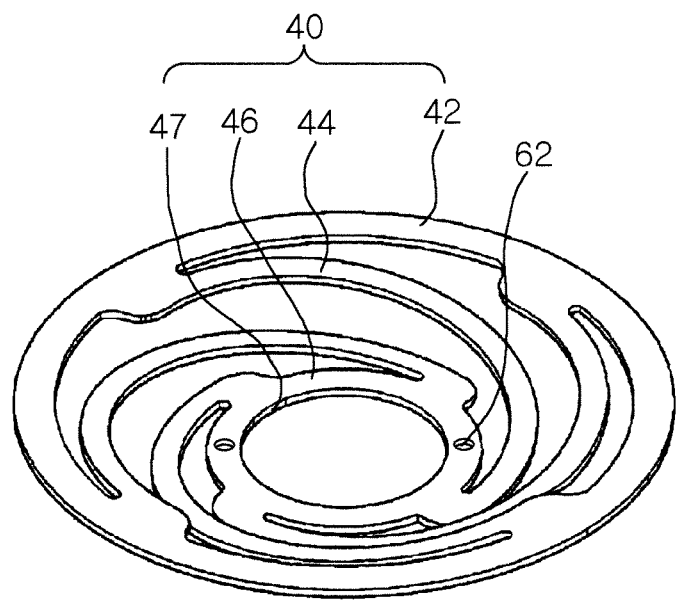
FIG. 10 is a perspective view schematically showing an elastic member applied to FIG. 9.

Referring to FIGS. 8 through 10, one of the elastic member 40 and the flat part 222 around the dented part 250 is provided with the protrusion part 60, and the other is provided with the protrusion part receiving hole 62, wherein the protrusion part 60 may be fixedly coupled to the protrusion part receiving hole 62.

The exemplary embodiment of FIG. 8 shows a case in which the protrusion part 60 is formed in the elastic member 40, and the exemplary embodiment of FIG. 9 shows a case in which the protrusion part 60 is formed in the flat part 222.

In the case of FIG. 9, the protrusion part receiving hole 62 may be formed in the yoke fixing part 46.

As set forth above, according to the exemplary embodiment of the present invention, concentricity between a yoke and an elastic member and between the yoke and a magnet may be secured to avoid interference between the magnet or the yoke and the inner diameter or the outer diameter of a coil during the generation of external impacts, whereby the disconnection of the coil may be prevented.

Further, the yoke and the elastic member may be integrally formed to increase the internal space of a linear vibrator housing, whereby the size and the inner displacement of a mass body may be secured.

Further, the size and the inner displacement of the mass body may be secured, whereby the vibration force of the linear vibrator may be increased.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear vibrator comprising:
  a housing having an internal space formed therein;
  a magnetic field unit including a yoke disposed in the internal space and having a magnet and a magnet insertion part formed therein, and interacting with a coil to which power is applied to linearly move in the internal space, the magnet insertion part determining an insertion position of the magnet; and
  an elastic member disposed in a space between the housing and the magnetic field unit and elastically supporting linear movement of the magnetic field unit,
  wherein the yoke comprises a flat part having the magnet insertion part formed therein,
  wherein the magnet insertion part includes a dented part dented from the yoke to protrude from the yoke,
  wherein the dented part is formed such that an outer surface thereof is press-fitted into a dented part insertion part formed in the elastic member, and
  wherein one of the elastic member and the flat part around the dented part is provided with a protrusion part and the other is provided with a protrusion part receiving hole, and
  the protrusion part is fixedly coupled to the protrusion part receiving hole.

2. The linear vibrator of claim 1, wherein the yoke comprises:
  a mass body fixing part being bent from the flat part in a mounting direction of the magnet to fix a mass body; and
  a claw part being bent from the mass body fixing part to support a bottom of the mass body.

3. The linear vibrator of claim 1, wherein the housing includes a cylindrical upper case of which a lower portion is open and a bracket closing the lower portion of the upper case and having the coil mounted thereon.

4. The linear vibrator of claim 1, wherein a yoke plate is provided on a surface opposite to a contact surface between the magnet and the yoke.

5. The linear vibrator of claim 1, wherein the coil has a cylindrical shape such that a space in which the magnetic field unit moves is formed, and
  magnetic fluid preventing a contact between the magnetic field unit and the coil is provided in a clearance therebetween.

6. The linear vibrator of claim 1, wherein the housing includes a damper formed on a surface thereof, the damper preventing the magnetic field unit from contacting the housing due to vibrations.

7. A linear vibrator comprising:
  a cylindrical upper case of which a lower portion is open;
  a bracket fixed to the open lower portion of the upper case to thereby form an internal space and having a coil fixed thereto, the coil having external power applied thereto;
  a magnetic field unit including a yoke disposed in the internal space and having a magnet and a magnet insertion part formed therein, and interacting with the coil to linearly move in the internal space when the power is applied to the coil, the magnet insertion part determining an insertion position of the magnet; and an elastic member configured of a ring-shaped housing fixing part fixed to the upper case, a yoke fixing part fixed to the other surface of the yoke, and a plurality of spiral connecting strip parts disposed such that an elastic space is formed between the housing fixing part and the yoke fixing part, wherein the yoke comprises a flat part having the magnet insertion part formed therein, wherein the yoke fixing part has a through hole formed therein, the magnet insertion part includes a denied part dented from the yoke to protrude from the yoke, and the dented part is press-fitted into the through hole to be fixed thereto, and wherein one of the elastic member and the flat part around the dented part is provided with a protrusion part and the other is provided with a protrusion part receiving hole, and the protrusion part is fixedly coupled to the protrusion part receiving hole.

8. The linear vibrator of claim 7, wherein the yoke comprises:
a mass body fixing part being bent from the flat part in a mounting direction of the magnet to fix a mass body; and
a claw part being bent from the mass body fixing part to support a bottom of the mass body.

9. A linear vibrator comprising:
a cylindrical upper case of which a lower portion is open;
a bracket fixed to the open lower portion of the upper case to thereby form an internal space and having a coil fixed thereto, the coil having external power applied thereto;
a magnetic field unit including a yoke disposed in the internal space and having a magnet and a magnet insertion part formed therein, and interacting with the coil to linearly move in the internal space when the power is applied to the coil, the magnet insertion cart determining an insertion position of the magnet; and
an elastic member configured of a ring-shaped housing fixing part fixed to the upper case, a yoke faxing part fixed to the other surface of the yoke, and a plurality of spiral connecting strip parts disposed such that an elastic space is formed between the housing fixing part and the yoke fixing part, wherein the yoke comprises a flat part having the magnet insertion part formed therein;

a mass body fixing part being bent from the flat part in a mounting direction of the magnet to fix a mass body;

and a claw part being bent from the mass body fixing part to support a bottom of the mass body, wherein the yoke fixing part has a through hole formed therein, the magnet insertion part includes a dented part dented from the yoke to protrude from the yoke, and the dented part is press-fitted into the through hole to be fixed thereto, and wherein one of an outer surface of the dented part and the yoke fixing part is provided with a protrusion part and the other is provided with a protrusion part receiving hole, and the protrusion part is fixedly coupled to the protrusion part receiving hole.

10. A linear vibrator comprising:
a cylindrical upper case of which a lower portion is open;
a bracket fixed to the open lower portion of the upper case to thereby form an internal space and having a coil fixed thereto, the coil having external power applied thereto;
a magnetic field unit including a yoke disposed in the internal space and having a magnet and a magnet insertion part formed therein, and interacting with the coil to linearly move in the internal space when the power is applied to the coil, the magnet insertion part determining an insertion position of the magnet; and
an elastic member configured of a ring-shaped housing fixing part fixed to the upper case, a yoke fixing part fixed to the other surface of the yoke, and a plurality of spiral connecting strip parts disposed such that an elastic space is formed between the housing fixing part and the yoke fixing part, wherein the yoke fixing part is fixedly bonded to the flat part, and an area of a bonding surface between the yoke fixing part and the flat part is smaller than that of the yoke fixing part.

* * * * *